United States Patent [19]
Ridenour et al.

[11] Patent Number: 5,544,406
[45] Date of Patent: Aug. 13, 1996

[54] TUBE FITTING ASSEMBLY METHOD

[75] Inventors: Ralph G. Ridenour, Mansfield; Dennis W. Kerr, Ashland, both of Ohio

[73] Assignee: Universal Enterprises, Inc., Mansfield, Ohio

[21] Appl. No.: 233,846

[22] Filed: Apr. 26, 1994

[51] Int. Cl.$^6$ .................................................. B21D 39/00
[52] U.S. Cl. .............................................. 29/520; 29/516
[58] Field of Search ............................. 29/515, 520, 516, 29/282, 283.5

[56] References Cited

U.S. PATENT DOCUMENTS

| | | | |
|---|---|---|---|
| 3,125,806 | 3/1964 | Cameron | 29/520 |
| 4,392,678 | 7/1983 | Adamczyk | 29/520 X |
| 5,080,406 | 1/1992 | Hyatt et al. | 29/520 X |

FOREIGN PATENT DOCUMENTS

| | | | |
|---|---|---|---|
| 3232297 | 3/1984 | Germany | 29/283.5 |
| 103408 | 11/1962 | Netherlands | 29/283.5 |

*Primary Examiner*—S. Thomas Hughes
*Attorney, Agent, or Firm*—Pearne, Gordon, McCoy & Granger

[57] ABSTRACT

A malleable tube is assembled to a rigid fitting by placing the end of the tube over one end of the fitting which has a barb with a locking face facing away from the end of the fitting and a sloping face facing the end of the fitting, the tube is gripped with jaws which have an inward nose projection of a small axial extent and this nose projection grips the tube at about the end of the fitting, force is applied between the fitting and the jaws to relatively move the fitting and tube longitudinally into the jaws until the nose projection has relatively moved past the barb on the fitting.

20 Claims, 2 Drawing Sheets

TUBE FITTING ASSEMBLY METHOD

BACKGROUND OF THE INVENTION

Tube and fitting assemblies have been devised in many different structures and methods of assembly. The usual case of a tube telescoped over a part of a fitting is where jaws of some kind have generally radially compressed the tube into sealing contact with that part of the telescoped tubing and fitting. In such case the tube is compressed radially inwardly to make the seal. This is difficult to actually make a good seal because the tube, even though malleable and has been deformed past its elastic limit, tends to have a certain amount of elasticity and springs back radially outwardly after the jaw pressure has been removed. Thus, in many cases the fluid seal between the tube and the fitting is destroyed or at least lowered as to the fluid pressure it will withstand.

SUMMARY OF THE INVENTION

The present invention is directed to a tube and fitting assembly and method of assembly wherein this radial expansion does not occur after the assembly pressure is removed and the assembly jaws move relatively longitudinally along the tube to give compression thereof. This longitudinal relative movement causes the tube to bulge outwardly and bulge inwardly in front of the jaws during relative movement so that if there is any relaxation of the tube when the pressure is removed this relaxation is radially inwardly instead of outwardly. This assures a tight seal which withstands pressure up to the bursting pressure of the tube.

Accordingly, an object of the invention is to make a tube fitting assembly by the method of moving jaws longitudinally relative to the telescoped tube and fitting.

Another object of the invention is to provide one or more barbs on the fitting and a compression nose ring on the jaws so that a small annular portion of the tube is deformed inwardly and then the jaws are moved relative to the tube and assembled telescope fitting in a longitudinal direction so that the nose ring compresses the tube and moves a portion of it longitudinally to make a seal with the fitting.

Other objects and a fuller understanding of the invention may be had by referring to the following description and claims, taken in conjunction with the accompanying drawings.

DESCRIPTION OF THE PREFERRED EMBODIMENTS

Figure 1:
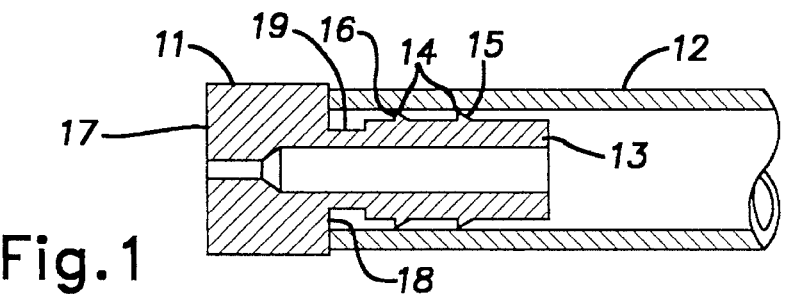
FIG. 1 is a longitudinal cross sectional view of a tube telescoped over a part of a fitting ready for assembly.
Figure 2:
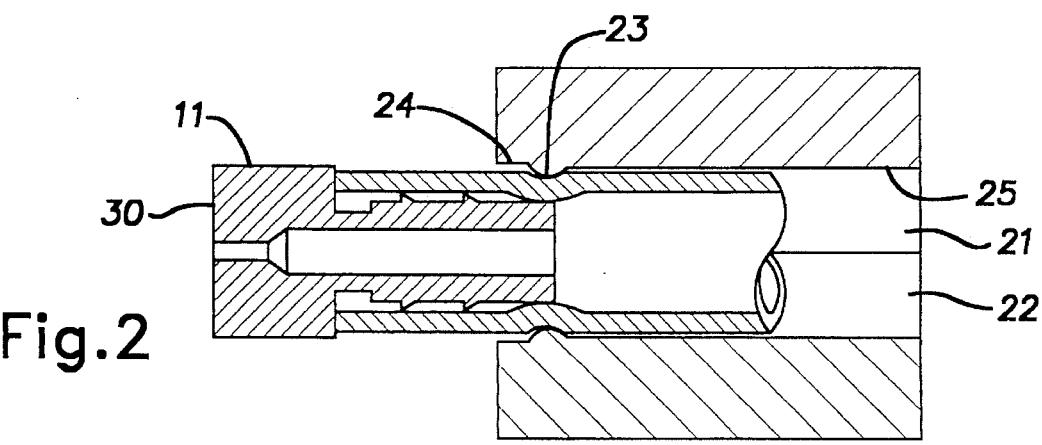
FIG. 2 is a longitudinal sectional view of jaws with a nose ring clamped on a small portion of the tube.
Figure 3:
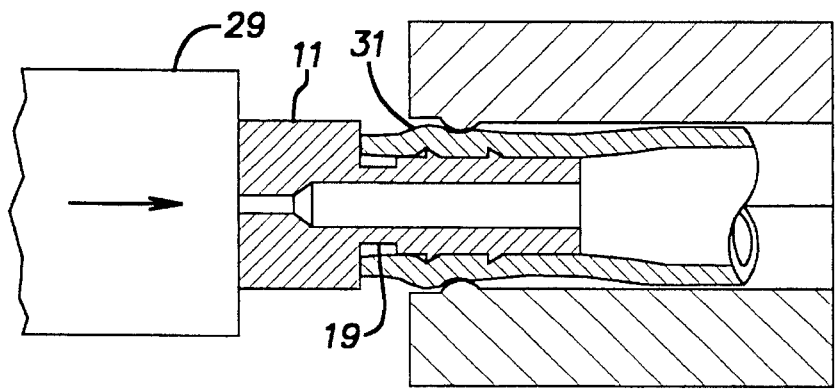
FIG. 3 is a similar longitudinal sectional view with the fitting and tube moved longitudinally part way into the jaw nose ring.
Figure 4:
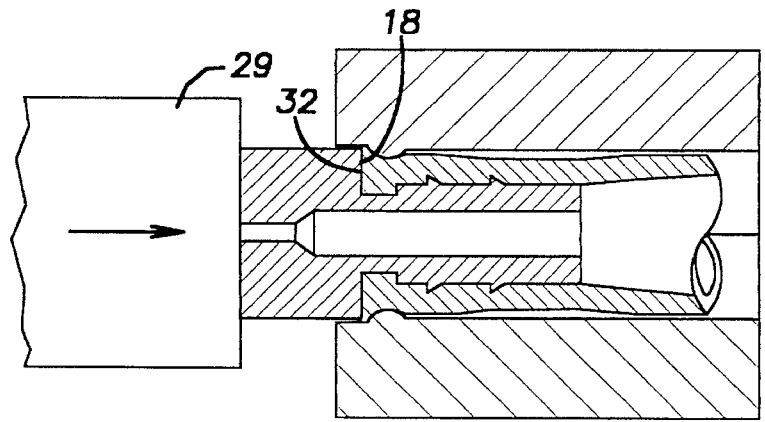
FIG. 4 is a longitudinal sectional view of the completed assembly.

The fitting and tube assembly method is disclosed in FIGS. 1–4 with FIG. 4 illustrating the finished assembly except for removal of the jaws. FIG. 1 shows a typical fitting 11 and a tube 12 with the tube telescoped over a forward end 13 of the fitting. The fitting has one or a plurality of barbs 14, in this case shown as two annular barbs. Each barb has a sloping face 15 facing the forward end 13 of the fitting and has a locking face 16 facing away from the end 13. Further, the fitting has an abutment 18 which is a longitudinal abutment arresting movement longitudinally of the tube 12 and has an annular surface 19, preferably a cylindrical surface contiguous to the abutment. The rear end 17 of the fitting may provide a wrench pad, such as a hexagonal surface. In the preferred embodiment, at least one of the barbs is annular so that a seal may be obtained at that area between the tube and the fitting.

In FIG. 1 the tube may loosely telescope over the forward end 13 of the fitting or it may be a friction fit with the barbs actually scraping along the inside diameter of the tube.

FIG. 2 shows two jaws 21 and 22, each with an inward nose projection 23. Two or more jaws may be used and when clamped on to the tube as shown in FIG. 2 this inward nose projection on the jaws makes a substantially annular nose ring and this is annular except for the split between the jaws. The jaws also have a small forward extension 24 and a longer rearward extension 25. The forward extension 24 has preferably a small clearance relative to the outside diameter of the tube and the rearward extension 25 also has essentially the same amount of clearance relative to the tube, for guiding the tube.

At this point longitudinal force is applied to start assembly. This may be applied by moving the jaws longitudinally relative to a stationary fitting, but is shown by force acting on a punch 29 brought against the end surface 30 of the fitting and, hence, longitudinal movement is provided relatively between the punch and the jaws and also between the jaws and the fitting and telescoped tube. FIG. 3 shows the assembly method about half way completed where the jaws do not spring open as this longitudinal relative movement is progressing so the metal of the tube, which is malleable, bulges radially outwardly at 31 ahead of the advancing nose ring 23. The bulge 31 may be restrained the forward extension 24 of the jaws. The relative longitudinal movement also causes the malleable tube to flow generally radially inwardly against the sloping faces 15 of the barbs 14. The flowing metal caused by this longitudinal relative movement causes the end of the tube 32 to be jammed against the abutment 18 and to be compressed radially inwardly at the cylindrical surface 19 by the time the assembly method is completed as shown at FIG. 4. It has been found that a fluid tight seal is achieved at each of the barbs, at the abutment 18 and at the cylindrical surface 19. This seal is established by the relative longitudinal movement without any radial inward compression of the jaws as the jaws move longitudinally relative to the punch 29. There is initial radially inward compression only at the nose ring 23. At least when the longitudinal force is removed and the jaws being removed from the tube, any relaxation of the tube is an inward radial relaxation rather than outward radial relaxation as in the prior art. It has been found that the tube end 32 expands somewhat radially right adjacent the abutment 18 and also is contracted radially inwardly into sealing engagement with the cylindrical surface 19 due to the flow of metal of the malleable tube. It has been found that the tube and fitting seal will withstand 1,000 PSI fluid pressure and in fact will make a tight seal up to the bursting pressure of the tube itself.

Figure 5:
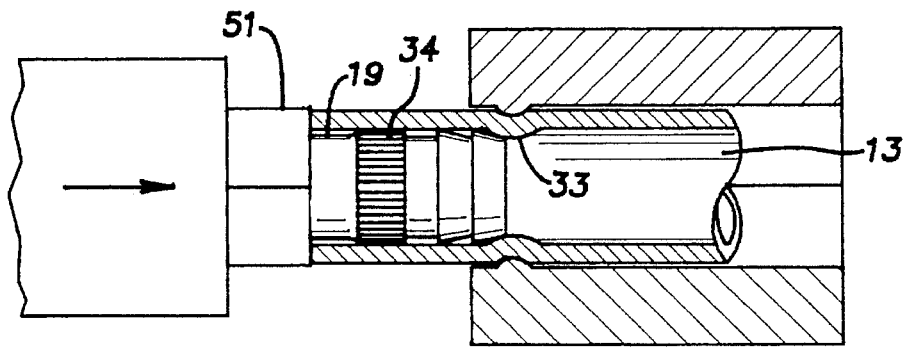
FIG. 5 is a longitudinal sectional view of a modified form of fitting wherein a knurl is provided for anti-rotation.
Figure 6:
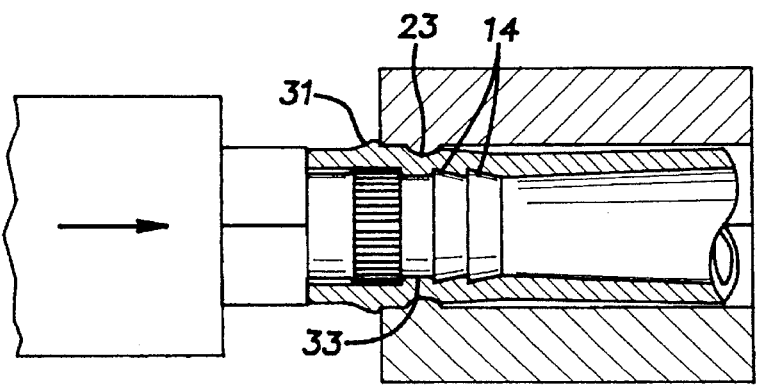
FIG. 6 is a longitudinal sectional view of the assembly method partly completed.
Figure 7:
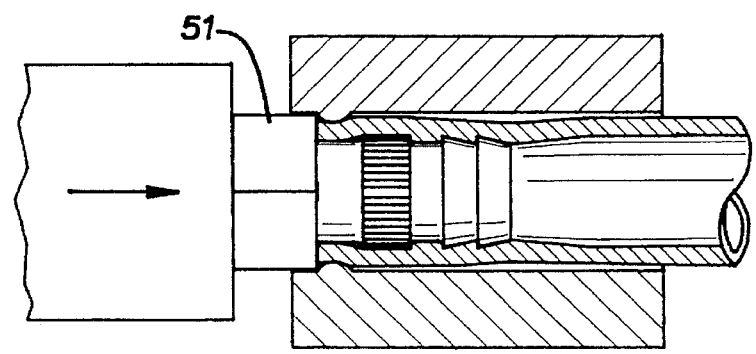
FIG. 7 is a longitudinal sectional view of the completed assembly.

FIGS. 5, 6 and 7 show a modification of the invention. FIG. 5 is like FIG. 2 with the jaws nose ring 23 clamped on the tube so that there is a radially inward bulge 33 to engage near the end of the fitting 51. The rear end 17 of the fitting may have the usual hexagonal wrench pad for holding or twisting the fitting, the same as in FIGS. 1–4.

FIG. 6 shows the assembly part way through where the nose ring has caused inward flow of the tube metal against the barbs 14, caused the outward bulge 31 in the tube ahead of the nose ring and caused the inward bulge 33 ahead of the nose ring.

In this embodiment an anti-rotation surface 34 is provided on the fitting between the inner most barb and the abutment 18. In FIGS. 5–7 this is a knurled surface on a previously cylindrical, slightly enlarged diameter portion of the fitting. The cylindrical surface 19 or neck is again provided adjacent the abutment 18. Again, with FIG. 6 similar to FIG. 3, this shows the progressive inward and outward bulges just forward of the nose ring and in FIG. 7 with the final assembly movement completed, the tube has been jammed against the abutment and has made a seal there as well as at the neck 19 and at the barbs, or at least the tips of the barbs 14. Usually, a seal does not occur at the knurls because the metal often does not flow enough inwardly to make a seal in the trough of these knurls.

Figure 8:
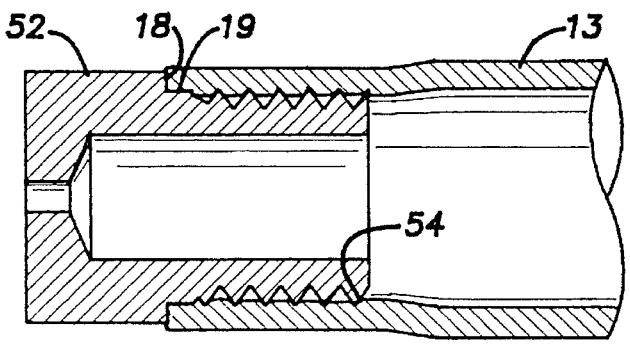
FIG. 8 is a longitudinal sectional view of another modification where helical threads are used.

FIG. 8 is a modification wherein the barbs are formed by external threads 54. These barbs are therefore not annular but are helical. FIG. 8 is like FIG. 7 showing the completed assembly with the jaws removed. It has been found that the tube does not flow radially inwardly sufficient to make seal at the thread barbs, instead the seal is provided at the abutment 18 and at the cylindrical surface 19. By holding the tube with some jaws which tightly grip the tube and relatively rotating the fitting 52, it has been found that this assembly can be unscrewed, and therefore, there are internal threads 55 formed on the inside of the tube. This is a way to form threads without cutting or rolling on the I.D. of the tube.

In fittings which have been tested and constructed in accordance with the invention of FIGS. 1–4, the barbs 14 have been annular barbs of about 0.015" to 0.030" larger radially than the cylindrical surface of the end of the fitting 17. For example, if the tube 12 used is ⅜" outside diameter, the commercial standard is ±0.004 of an inch and with 0.032" of wall thickness. Such a tube and fitting assembly can withstand the 2,800 psi bursting pressure of the tube. Even if a number of fittings 11 are manufactured and all mixed together in one tote tray, this may put slight nicks in the barbs, but it has been found that these nicks are filled in by the flow of the tube metal by the time the fitting assembly is complete as shown in FIG. 4. In any event, a seal is made at the cylindrical surface 19 and also made at the abutment 18 so that the totality of the seals prevents leakage up to the bursting pressure of the tube. For ⅛" O.D. tube, the commercial standard tolerance is ±0.002 with 0.028" wall thickness with a tolerance of ±0.002. In this case, the barbs typically may be from 0.005 to 0.015" in radial extent. These are also dimensions which are true for the modifications shown in FIGS. 5–7. For the threaded variation in FIG. 8, this can be a standard thread which is not tapered. It may be, for example, cut by a threading die into the fitting 52 by a standard die set such as a 10-24 threading die.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A method of assembling a malleable tube to a rigid fitting, the fitting having an external surface with at least one barb thereon, said at least one barb having a locking face facing away from a forward end of the fitting and a sloping face facing the forward end of the fitting, and the fitting having an abutment facing the forward end of the fitting and located rearward of the barb, and said method comprising the steps of:

placing the tube over the forward end of the fitting and the at least one barb and engaging the abutment;

gripping the tube with jaws which have an inward nose projection of a small axial extent at about the forward end of the fitting;

longitudinally moving the fitting and the tube relative to the jaws until the nose projection has relatively moved past the at least one barb; and guiding the tube with a rear portion of said jaws during the step of relative longitudinal movement.

2. The method as set forth in claim 1, wherein the step of relative longitudinal movement includes compressing the tube longitudinally with the nose protection.

3. The method as set forth in claim 2, wherein said longitudinal compression of the tube is ahead of the nose projection and causes the tube to move radially inward against the fitting making a sealing area therebetween.

4. The method as set forth in claim 3, wherein the sealing area is at least one barb.

5. The method as set forth in claim 3, wherein the sealing area is at an annular area rearward of the at least one barb.

6. The method as set forth in claim 1, wherein said relative longitudinal movement causes the tube to expand radially outward ahead of the nose projection.

7. The method as set forth in claim 6, further comprising the step of restraining the outward expansion of the tube ahead of the nose projection with a forward portion of said jaws during the step of relative longitudinal movement.

8. The method as set forth in claim 1, wherein said relative longitudinal movement causes the tube to move inwardly with a radial component at places permitted by the shape of the fitting.

9. The method as set forth in claim 1, wherein the jaw nose projection is substantially annular.

10. The method as set forth in claim 1, wherein at least one barb is annular.

11. The method as set forth in claim 1, including a non-cylindrical surface on said fitting and wherein the relative longitudinal movement moves the tube into engagement with said non-cylindrical surface for anti-torque movements of said tube and fitting.

12. The method as set forth in claim 11, wherein said non-cylindrical surface is on one of said abutment, said at least one barb, and at least a portion of said exterior surface.

13. The method as set forth in claim 11, wherein said non-cylindrical surface is a knurled surface.

14. The method as set forth in claim 1, wherein the relative longitudinal movement continues until the nose projection is adjacent the abutment.

15. A method of assembling a malleable tube to a rigid fitting, the fitting having an external surface at a forward end of the fitting, an abutment facing the forward end of the fitting and located rearward of the external surface, and a cylindrical surface at a forward side of said abutment and radially recessed from said external surface, said method comprising the steps of:

placing the tube over the forward end of the fitting and the external surface and engaging the abutment;

gripping the tube with jaws which have an inward nose projection of a small axial extent at about the forward end of the fitting;

longitudinally moving the fitting and the tube relative to the jaws until the nose projection is adjacent the abutment;

longitudinally compressing the tube ahead of the nose projection during the step of relative longitudinal movement to deform the tube radially inward against the fitting; and forming a seal between the tube and one of said abutment and said cylindrical surface.

16. The method as set forth in claim 15, further comprising the step of forming a seal between said tube and at least one barb located on the external surface, said at least one barb having a locking face facing away from the forward end of the fitting and a sloping face facing the forward end of the fitting.

17. The method as set forth in claim 15, further comprising the step of guiding the tube with a rear portion of said jaws during the step of relative longitudinal movement.

18. The method as set forth in claim 15, further comprising the step of restraining an outward expansion of the tube ahead of the nose projection with a forward portion of said jaws during the step of relative longitudinal movement.

19. The method as set forth in claim 15, further comprising the step of engaging the tube with a non-cylindrical surface on said fitting during the step of relative longitudinal movement to prevent relative rotation between the tube and the fitting.

20. The method as set forth in claim 19, wherein said non-cylindrical surface is on one of said abutment, at least one barb located on the external surface, and at least a portion of said exterior surface.

\* \* \* \* \*